(12) United States Patent
Yamaguchi et al.

(10) Patent No.: US 7,523,532 B2
(45) Date of Patent: Apr. 28, 2009

(54) NON-WOVEN SELF-WRAPPING ACOUSTIC SLEEVE AND METHOD OF CONSTRUCTION THEREOF

(75) Inventors: Hiroki Yamaguchi, Sagamihara/Kanagawa (JP); Tomonori Inamura, Machida (JP); Koushiro Hashimoto, Aisugi (JP)

(73) Assignee: Federal Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/697,836

(22) Filed: Apr. 9, 2007

(65) Prior Publication Data

US 2008/0006432 A1    Jan. 10, 2008

Related U.S. Application Data

(60) Provisional application No. 60/790,733, filed on Apr. 10, 2006.

(51) Int. Cl.
*D04H 1/46* (2006.01)

(52) U.S. Cl. ............................. 28/110; 28/112; 28/142; 28/122

(58) Field of Classification Search .................. 28/110, 28/112, 109, 142, 107, 111, 113–115, 103, 28/116, 117, 122, 123–126; 138/123, 128, 138/156; 156/148, 149, 466; 174/93
See application file for complete search history.

(56) References Cited

U.S. PATENT DOCUMENTS

| | | | |
|---|---|---|---|
| 1,452,704 A * | 4/1923 | Poulin et al. ................. 474/253 |
| 2,758,043 A * | 8/1956 | Cryor .......................... 138/141 |
| 3,166,823 A * | 1/1965 | Bernard ........................ 28/110 |
| 3,192,598 A * | 7/1965 | Stevenson et al. ............. 28/111 |
| 3,254,678 A | 6/1966 | Plummer |
| 3,312,250 A | 4/1967 | Sirignano et al. |
| 3,673,024 A * | 6/1972 | Eriksson ...................... 156/137 |
| 3,885,593 A * | 5/1975 | Koerber et al. .............. 138/128 |
| 3,909,893 A | 10/1975 | Wilde |
| 3,952,121 A * | 4/1976 | Dilo ........................... 428/34.1 |
| 4,071,394 A * | 1/1978 | Ball ............................. 28/110 |
| 4,138,772 A * | 2/1979 | Dilo ............................. 28/110 |
| 4,369,081 A * | 1/1983 | Curry et al. ................. 156/148 |
| 4,790,052 A * | 12/1988 | Olry ............................. 28/110 |
| 4,862,922 A | 9/1989 | Kite, III |
| 4,891,256 A | 1/1990 | Kite, III et al. |
| 4,955,116 A * | 9/1990 | Hayamizu et al. ............. 28/110 |
| 4,970,351 A | 11/1990 | Kirlin |
| 5,645,906 A | 7/1997 | Park et al. |
| 5,796,045 A | 8/1998 | Lancien et al. |
| 5,849,379 A | 12/1998 | Gladfelter et al. |
| 6,265,048 B1 * | 7/2001 | Rydin et al. ................. 428/121 |

(Continued)

*Primary Examiner*—Amy B Vanatta
(74) *Attorney, Agent, or Firm*—Robert L Stearns; Dickinson Wright PLLC

(57) ABSTRACT

A non-woven acoustic sleeve and method of construction thereof provides routing and protection for elongate members and suppression of noise generation from the elongate members while in the sleeve. The sleeve has an elongate wall with opposite sides that are self-wrapping about a longitudinal axis to define a generally tubular cavity. The opposite sides are extendable away from one another under an externally applied force to allow the elongate members to be disposed radially into or removed from the cavity. When the external force is released, the opposite sides of the wall to return to their self wrapped configuration to enclose the elongate members and suppress noise therefrom.

15 Claims, 2 Drawing Sheets

U.S. PATENT DOCUMENTS

| | | |
|---|---|---|
| 6,309,721 B1 | 10/2001 | Gladfelter et al. |
| 6,936,553 B2 | 8/2005 | Von Samson-Himmelstjerna |
| 2003/0029080 A1* | 2/2003 | Busby et al. ................. 47/65.8 |
| 2003/0097740 A1* | 5/2003 | Jourde et al. .................. 28/107 |
| 2004/0219846 A1 | 11/2004 | Sellis et al. |
| 2005/0011569 A1* | 1/2005 | Putta et al. .................. 138/110 |

* cited by examiner

NON-WOVEN SELF-WRAPPING ACOUSTIC SLEEVE AND METHOD OF CONSTRUCTION THEREOF

CROSS-REFERENCE TO RELATED APPLICATION

This application claims the benefit of U.S. Provisional Application Ser. No. 60/790,733 filed Apr. 10, 2006, which is incorporated herein by reference in its entirety.

BACKGROUND OF THE INVENTION

1. Technical Field

This invention relates generally to sleeves for protecting elongate members, and more particularly to non-woven self wrapping acoustic protection sleeves for receiving elongate members therein.

2. Related Art

It is known that wires and wire harnesses carried in sleeves in vehicles, such as in automobiles, aircraft or aerospace craft, can produce undesirable noise while the vehicle is in use. The noise typically stems from the wires or harnesses vibrating against the sleeve and/or adjacent components, wherein the vibration results from vibrating components in the vehicle, and in the case of automotive vehicles, movement of the vehicle over a ground surface. As such, it is customary to spirally wrap wires and wire harnesses with sound masking tape to reduce the potential for noise generation. Unfortunately, applying tape is labor intensive, and thus, costly. In addition, the appearance of the tape can be unsightly, particularly over time as the tape wears. Further, in service, tape can provide difficulties in readily accessing the wound wires.

Other than applying tape, it is known to incorporate acoustic protection in the form of woven, braided or knitted fabric sleeves about the wires to reduce the potential for noise generation. The sleeves are typically manufactured from noise suppressing materials, such as selected monofilament and texturized multifilament polyester yarns. The sleeves are either wrapped and fastened about the wires, or applied as a self wrapping sleeve construction. If wrapped and fastened, additional costs are incurred for the fasteners and in attaching the fasteners to the sleeves. Further, additional labor and/or processes are typically involved to secure the sleeves about the wires. And thus, although these sleeves generally prove useful in suppressing noise generation in use, they can be relatively costly to manufacture, given that they are woven, knitted or braided, with additional costs being incurred to attach fasteners to the sleeves and to secure the sleeves about the wires.

An acoustic sleeve manufactured according to the present invention overcomes or greatly minimizes any limitations of the prior art described above, and also provides enhanced potential to suppress noise generation by elongate members carried in the sleeves.

SUMMARY OF THE INVENTION

One aspect of the invention provides a resilient, non-woven acoustic sleeve for routing and protecting elongate members and suppressing noise generation from resulting due to vibration or other types of movement of the elongate members. The sleeve has an elongate wall with opposite sides that are self-wrapping about a longitudinal axis to define a generally tubular cavity. The opposite sides can be extended away from one another under an externally applied force to allow the elongate members to be disposed radially into or removed from the cavity. Upon disposing the elongate members within the partially opened cavity, the external force is released, thereby allowing the opposite sides of the wall to return to their self wrapped position to enclose the wires and inhibit them from generating noise.

The non-woven material forming the wall of the sleeve is an engineered plastics material, preferably formed from polyester, and more preferably from polyethylene terephthalate (PET). The wall is constructed having a suitable thickness having mechanically intertwined non-woven fibers that act as an acoustic dampener, while also being self-curled into a tubular shape. Accordingly, when vibration is present with the vehicle, the thickness and construction of the wall cushions or dampens the vibration to prevent the elongate members contained in the sleeve from generating noise through vibration. Should the elongate members vibrate, the wall dampens the noise resulting therefrom. To provide maximum physical protection to the elongate wires and to maximize the dampening potential provided by the sleeve, the opposite sides of the sleeve preferably self curl to overlap one another. As such, the elongate members in the cavity are completed enclosed in the cavity formed by the wall of the sleeve.

Another aspect of the invention includes a method of constructing a self wrapping sleeve for protecting elongate members and preventing noise generation resulting from the elongate members therein. The method includes: providing a sheet of non-woven polyester material with a predetermined thickness and compacting the thickness of the sheet to a predetermined thickness. Next, forming the compacted wall into a tubular shape, and then, heat-setting the wall into the tubular shape. Then, optionally, cutting the tubular sheet into desired lengths for end use. It should be recognized that the heating and cutting steps could be in any order, as desired. In an further aspect of the invention, the sheet is preferably reduced in thickness at least partially during a needlefelting process, wherein individual fibers of the sheet become entangled with one another, and the sheet is increased in density.

Accordingly, self wrapping non-woven sleeves produced in accordance with the invention act as an acoustic barrier for elongate members contained within the sleeves, and thus, act to prevent the transmission of undesirable sound waves. The sleeves can be constructed to accommodate virtually any package size by adjusting sizes of the non-woven fabric from which the sleeves are formed. If desired, the sleeves could also be equipped with a variety of closure mechanisms, though the sleeves are preferably shaped suitably for use as a self wrapping construction. Further, sleeves manufactured in accordance with the invention are flexible in 3-D without affecting their protective strength or their acoustic barrier effectiveness, thereby allowing the sleeves to be routed as needed throughout relatively tight spaces.

BRIEF DESCRIPTION OF THE DRAWINGS

These and other objects, features and advantages will become readily apparent to those skilled in the art in view of the following detailed description of presently preferred embodiments and best mode, appended claims, and accompanying drawings, in which:

DETAILED DESCRIPTION OF PREFERRED EMBODIMENTS

Figure 1:
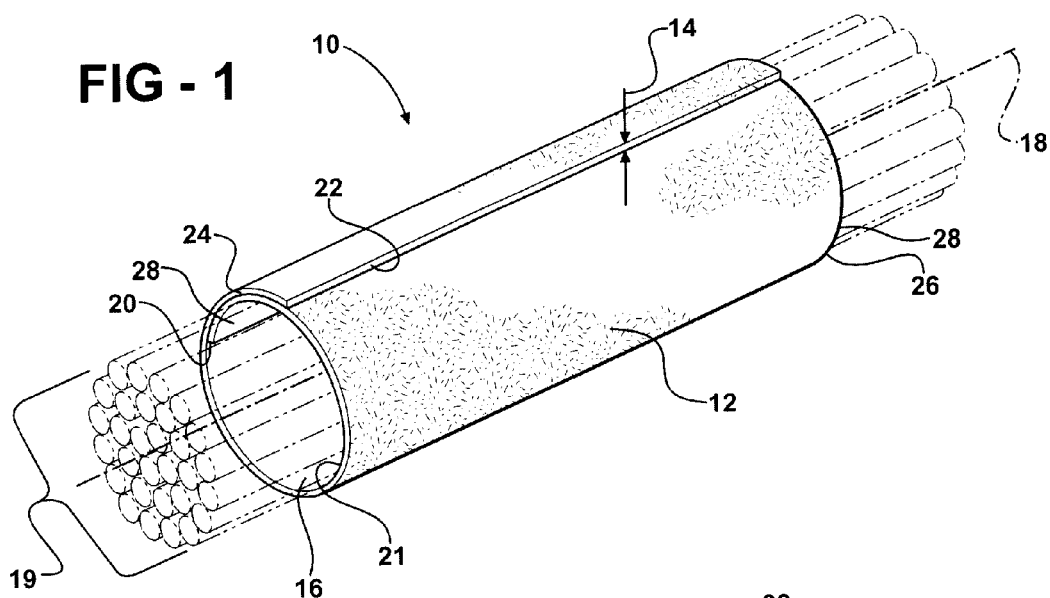
FIG. 1 is a schematic perspective view of a self-wrapping acoustic sleeve constructed according to one presently preferred embodiment of the invention carrying elongate members therein.

Referring in more detail to the drawings, FIG. 1 shows a non-woven sleeve 10 constructed according to one presently preferred embodiment of the invention. The sleeve 10 has a wall 12 constructed from a non-woven material and formed into a self-wrapping tubular configuration to define an enclosed inner cavity 16 when in its self-wrapped configuration. The cavity 16 is tubular and readily accessible along a longitudinal axis 18 so that elongate members, such as wires 19 or a wire harness, for example, can be readily disposed radially toward the axis 18 into the cavity 16, and conversely, removed from the cavity 16, such as during service. The non-woven material forming the wall 12 is an abrasion resistant, flexible, resilient, acoustic dampening polyester material, and in one presently preferred embodiment, is formed from PET, by way of example and without limitation. Accordingly, the sleeve 10 is well suited to protect the elongate members 19 within the cavity 16 against abrasion and damage, while also inhibiting the elongate members 19 from rattling and squeaking, or otherwise producing unwanted noise.

The sleeve 10 can be constructed having any desired length and various finished wall thicknesses 14 as well as varying densities, as desired for the intended application. By way of example and without limitation, the wall 12 of the sleeve in FIG. 1 can be constructed from about 0.6 oz of PET per square foot, for lighter applications, or constructed from about 1.5 oz of PET per square foot for heavier duty applications. Further, use of a PET material comprised of 90% standard PET and 10% low-melt PET has been found to provide enhanced performance in acoustic sleeve applications. Accordingly, depending on the application, the sleeve 10 can be constructed having a relatively small outer diameter, while still providing an inner surface 21 of suitable inner diameter to provide the cavity 16 with sufficient volume to contain a predetermined lateral cross-sectional area of wires. If the application is more severe, then the thickness 14 of the wall 12 may need to be increased. In addition, increasing the wall thickness 14 typically provides the sleeve 10 with more rigidity, and thus, larger cavities 16 can be constructed while still providing the sleeve 10 with adequate rigidity and strength to contain increased numbers and diameters of wire.

The wall 12 has opposite sides 20, 22 extending along the axis 18 that terminate at opposite ends 24, 26 defining openings 28. When the wall 12 is in its self-wrapped configuration, generally free from any externally applied forces, the sides 20, 22 preferably overlap one another at least slightly to fully enclose the cavity 16, and thus, provide maximum protection to the wires 19 contained in the cavity 16.

The sides 20, 22 are readily extendable away from one another under an externally applied force to at least partially expose the cavity 16. Accordingly, the wires 19 can be readily disposed into the cavity 16 during assembly or removed from the cavity 16 during service. Upon releasing the externally applied force, the sides 20, 22 return automatically to their natural, overlapping self-wrapped position, provided the wires 19 within the cavity 16 do not interfere with the inner surface 21. It should be recognized that the cavity 16 can be sized to provide a close fit about the wires 19 to prevent excessive radial movement of the wires 19 within the cavity 16, thereby further reducing the potential for their rattling and rubbing against one another. As such, the rubbing or kinetic friction between abutting wires 19 can be reduced, thereby reducing wear in use, and thus, extending the useful life of the wires 19.

Figure 2:
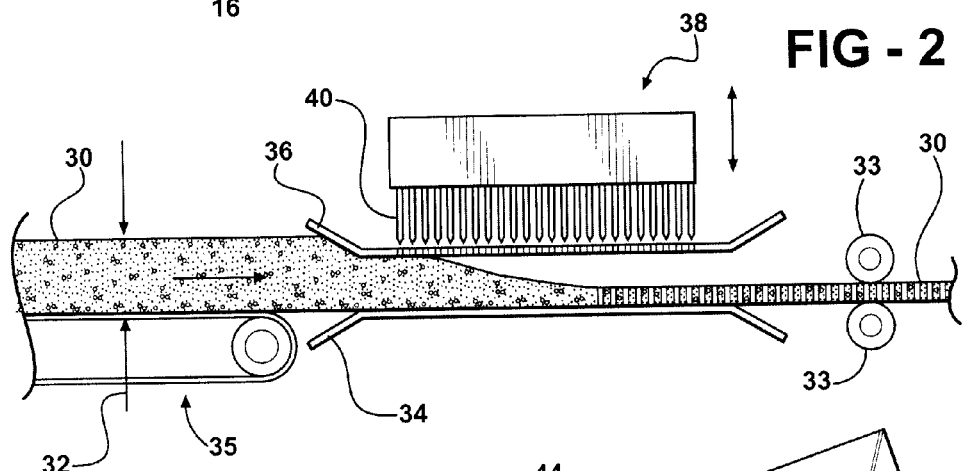
FIG. 2 is a schematic side view of a needle felting apparatus used in one aspect of a manufacturing process for producing the sleeve of FIG. 1.

Another aspect of the invention includes a method of constructing the self-wrapping sleeve 10 used to protect and to prevent noise generation resulting from movement of the elongate members 19. The method includes providing a sheet 30 of material of an initial predetermined thickness 32, such as PET, and in an acoustic application, preferably containing about 10% low-melt PET, for example, and preferably feeding the sheet 30 between a pair of parallel plates 34, 36 to compact or reduce the sheet thickness from the predetermined initial thickness 32 to a lesser thickness, and possibly the finished thickness 14. The sheet 30, during feeding, can be supported on a bed 35, which can be either be an idler bed that supports the sheet for translation, or the bed 35 could be driven to facilitate translation of the sheet 30. In addition, the feeding can be facilitated by drawing the sheet via a pair of rollers 33, for example, that are positioned downstream from the plates 34, 36. To facilitate reduction in the thickness of the sheet 30 from the initial thickness 32 to the finished thickness 14, and to enhance the noise dampening capacity of the wall 12, the sheet preferably undergoes a needlefelting process with a needlefelting apparatus (FIG. 2), such as a needlefelting loom 38, wherein the needlefelting is represented here, for example, as taking place between the plates 34, 36.

Figure 3:
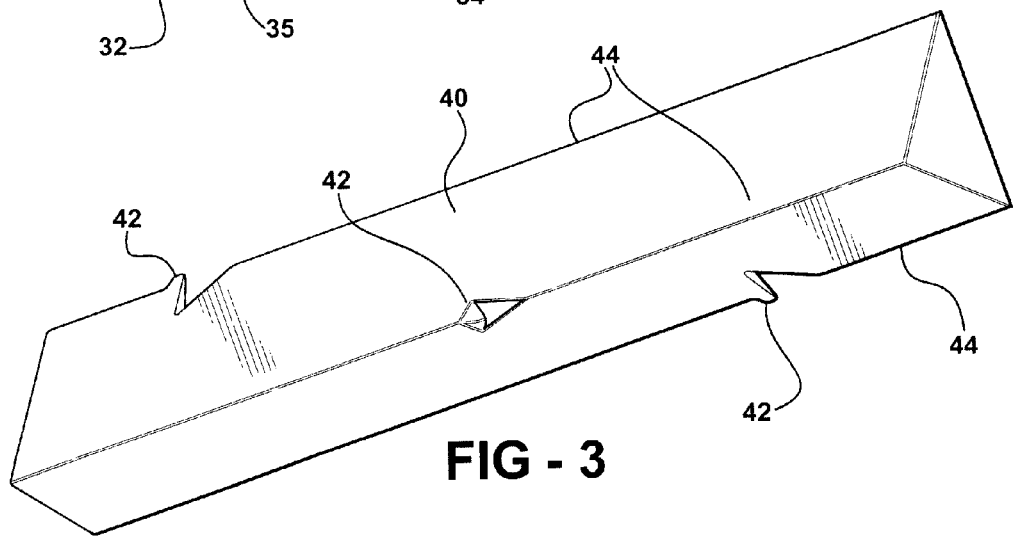
FIG. 3 is an enlarged plan view of a needle from the apparatus of FIG. 2.

During the needlefelting process, fibers of the polyester material 30 are pierced by a plurality of needles 40 (FIGS. 2 and 3), such as about 4000 needles per 1 meter width of material 30, for example, in plunging reciprocation to entangle individual fibers comprising the material 30. During the needlefelting process, the thickness of the sheet is further compacted between the plates 34, 36 to approximate the finished thickness 14 of the sleeve wall 12. The needles 40 can penetrate the wall 12 to a predetermined depth, ranging from partially through the thickness of the wall 12 to completely through the thickness of the wall 12. As shown in FIG. 3, the needles 40 are configured to promote entanglement of individual fibers within the sheet 30, and are typically triangular in lateral cross-section with barbs 42 extending laterally outwardly from three edges 44. Depending on the desired finished material characteristics, the number and type of needles 40, depth of penetration of the needles 40 into the material 30, spacing of needles 40, and rate of material 30 feed through the apparatus 38 can be varied. Further, different types of needlefelting apparatus can be used, such as down punch, up punch, or double punch, for example.

Upon needlefelting the PET sheet 30, portions of the sheet 30 can be wrapped or formed into a tubular form of a predetermined size, such as by wrapping the material 30 about a mandrel, for example. The tubular form of material 30 can then be heated while in its tubular form, thereby causing the sheet portions 30 to be heat-set to retain the tubular shape when removed from the mandrel. It should be recognized that any suitable heat-forming process can be used to form the sheet portions into the tubular construction, as desired. Further, it should be recognized that the temperature for heating is selected to be sufficiently high to permanently heat-set the material 30. Upon heat-setting the tubular portion 30, it can be cut into desired lengths for end use. Of course, if desired, separate sheet portions 30 could be cut into the desired finished length of the sleeve 10 prior to forming them into their heat-set tubular form.

Rather than forming the tubular shape about a mandrel, the portions of the sheet 30 can be constructed in a tubular form of a predetermined size, such as by pulling the material 30 between a pair of members, such as rollers, for example, in a pultrusion process. During the pultrusion, the sheet 30 can be caused to curl about the longitudinal axis 18, such as by regulating the individual speeds of the rollers and/or the direction of feed of the sheet 30 about the rollers. The degree of curl is preferably controlled such that the opposite sides 20, 22 slightly overlap one another. Upon curling the material 30, or while curling the material 30, a heat treating process can be used to heat-set the tubular material 30 in its tubular form.

Further, another method of forming the self-wrapping sleeve 10 is contemplated wherein a jig is used that has a spiral shaped pattern therein to form the sheet 30 into its finished self-wrapped shape. One side of the sheet 30, such as the outer side 22, for example, can be disposed in a slot of the jig to maintain the side 22 in a generally stationary attitude, while the other side 20 can be curled or rotated in a generally spiral inner path relative to the outer side 22 and into the spiral shaped pattern in the jig. The opposite sides 20, 22 are rotated relative to one another until the desired degree of curl is imparted on the sheet 30, wherein the opposite sides 20, 22 are preferably overlapped with one another. Upon being formed into the desired spiral shape, the material 30 can be heated sufficiently to retain the degree of self-wrapping heat-set shape desired, such as shown in FIG. 1.

The acoustic dampening properties of sleeves 10 constructed according to the invention have been tested, with favorable results over presently known woven, knitted, and braided acoustic sleeving constructions being reported. One such test, referred to as a "hit mode" test, is performed on a stand having a vertically supported metal plate and a swinging fixture spaced from the plate for supporting a section of sleeving 10 being tested. The fixture has a pivotal arm on which the sleeving 10 is supported. With the sleeving supported on the pivotal arm, the arm is pivoted a predetermined number of degrees, by way of example and without limitations, about ninety degrees to a generally horizontal attitude, and then released. The arm swings downwardly via gravity, thereby causing the sleeving 10 to impact the metal plate. As a result, noise is produced during impact of the sleeving 10 with the plate. The noise level in decibels (dB) is monitored using any standard noise monitoring device.

Figure 4:
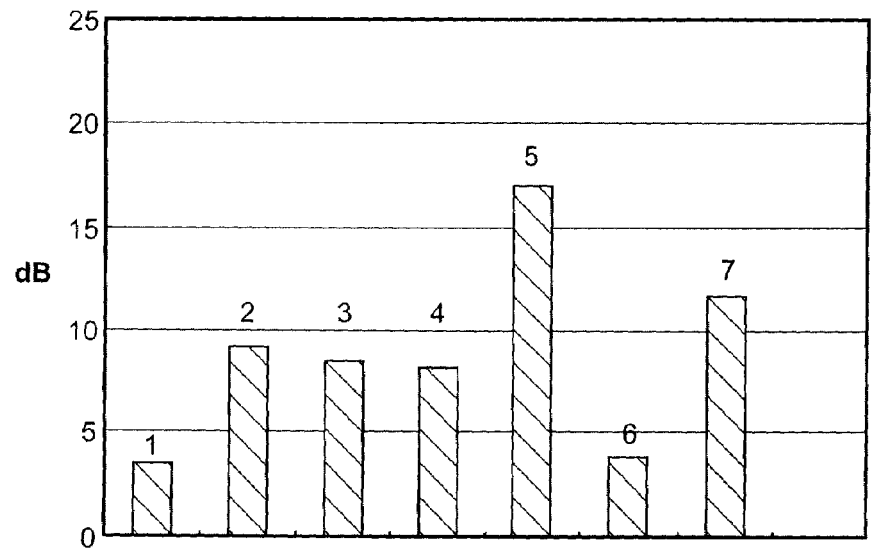
FIG. 4 is a bar chart showing results from one acoustic test conducted on a sleeve constructed in accordance with the invention.

The results of the hit mode tests described above are shown in FIG. 4 on a bar chart. The chart has the magnitude of dampened noise levels, represented in dB, along a vertical axis, and different types of sleeving tested along a horizontal axis. The different bars are number 1-7, with bars 1-4 representing different woven textile sleeving products, bar 5 representing a sleeve constructed in accordance with the invention from non-woven PET that is about 1.5 oz per square foot, and bars 6-7 representing sleeving constructed with 3 mm and 5 mm thick urethane, respectively. As can be seen, the non-woven PET sleeve of bar 5 demonstrated an ability to dampen substantially higher dB noise levels than all the other woven sleeves and urethane sleeves tested.

Another acoustic test conducted is referred to as a "vibration mode" test. The vibration mode test is performed with the use of a vibratory device having a platform for placing objects thereon. The frequency of vibration can be calibrated via an instrument panel, such as a transformer, and the noise levels are monitored via a standard dB measuring device. In each of the tests, a uniform wire harness was inserted into similarly sized sleeves of different construction, and then the sleeves were set on the platform. Each test was conducted at the same vibration frequency, and the resulting noise levels were monitored via the standard dB measuring device.

Figure 5:
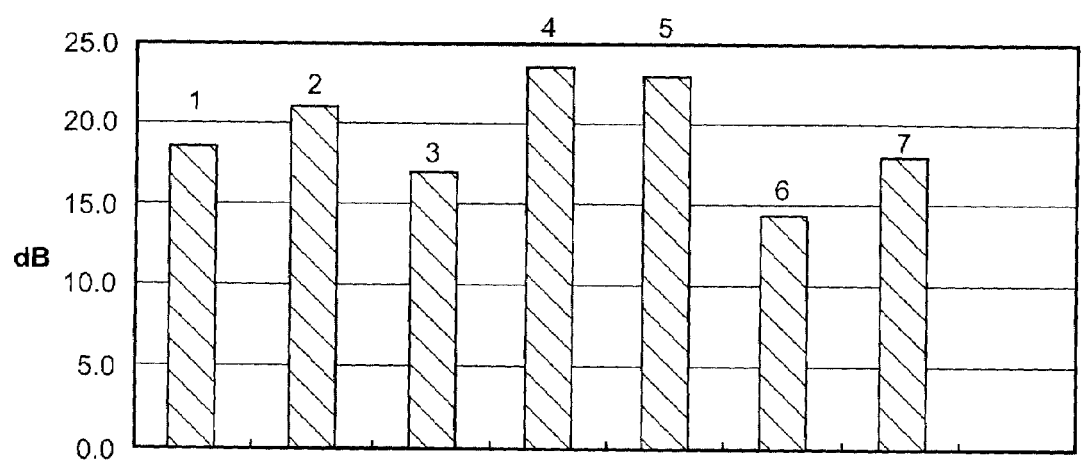
FIG. 5 is a bar chart showing results from another acoustic test conducted on a sleeve constructed in accordance with the invention.

The results of the vibration mode tests are shown in FIG. 5 on a bar chart. The chart has the noise levels dampened, represented in dB, along a vertical axis, and different types of sleeving tested along a horizontal axis. The different bars are number 1-7, with bars 1-2 representing different woven textile sleeving products, bar 3 representing a braided textile sleeve, bars 4 and 5 representing sleeves constructed in accordance with the invention as shown generally in FIG. 1 from about 0.6 oz of PET per square foot and about 1.5 oz of PET per square foot PET, respectively, and bars 6-7 representing sleeving constructed with about 2 mm and 4 mm thickness urethane, respectively. Again, as represented by the results of the tests, the PET non-woven sleeves of bars 4 and 5 constructed according to presently preferred embodiments of the invention demonstrated an ability to dampen higher dB noise levels than all the other textile woven and knitted sleeves tested. Of course, it should be recognized that the hit mode test and vibration mode test were performed using a scientific approach, and thus, were conducted in a qualified sound booth.

Accordingly, sleeves 10 constructed in accordance with the invention provide an easy mechanism to route wires 19 throughout relatively tight spaces, such as in an engine compartment of a vehicle, for example, and to thereafter service the wires, if necessary. Additionally, the sleeves 10 provide enhanced acoustic dampening properties to the wires carried therein, and thus, inhibit noise from being generated externally of the sleeves 10.

It is to be understood that other embodiments of the invention which accomplish the same function are incorporated herein within the scope of any ultimately allowed patent claims.

What is claimed is:

1. A method of constructing a self-wrapping sleeve used to route and protect elongate members and to prevent noise generation from the elongate members, the method comprising the steps of:
   providing a sheet of non-woven engineered material having a predetermined initial thickness;
   needlefelting the sheet to a predetermined depth;
   forming the needlefelted sheet into a tubular shape with opposite sides of the sheet being overlapped with one another; and
   heat-setting the sheet to remain biased in said tubular shape with the opposite sides remaining in detached and readily separable relation with one another under an externally applied force, wherein the opposite sides automatically return substantially to their biased overlapping relation upon releasing the externally applied force.

2. The method of claim 1 further including reducing the initial thickness of said sheet to a finished thickness that is less than said initial thickness.

3. The method of claim 2 further including reducing the initial thickness at least partially during said needlefelting step.

4. The method of claim of claim 2 further including reducing the initial thickness at least partially between a pair of plates spaced from one another a distance less than said initial thickness.

5. The method of claim 4 further including drawing said sheet between said plates.

6. The method of claim 5 further including using a pair of rollers to perform the drawing.

7. The method of claim 1 further including wrapping said sheet about a mandrel of a predetermined diameter in said forming step.

8. The method of claim 1 further including needlefelting said sheet completely through said initial thickness.

9. The method of claim 1 further including cutting said sheet to a finished length of said sleeve.

10. The method of claim 9 further including performing said cutting after said forming step.

11. The method of claim 9 further including performing said cutting before said forming step.

12. A method of constructing a self-wrapping sleeve used to route and protect elongate members and to prevent noise generation from the elongate members, the method comprising the steps of:

providing a sheet of non-woven engineered material having a predetermined initial thickness;

compacting said sheet to a reduced thickness;

forming the compacted sheet into a tubular shape with opposite sides of the sheet being overlapped with one another; and heat-setting the sheet in said tubular shape with the opposite sides remaining detached and readily separable away from one another under an externally applied force, wherein the opposite sides automatically return substantially to their biased overlapping relation upon releasing the externally applied force.

13. The method of claim 12 further including needlefelting said sheet and entangling individual fibers within said sheet.

14. The method of claim 13 further including performing the needlefelting during the compacting step.

15. The method of claim 14 further including compacting the initial thickness between a pair of plates spaced from one another a distance less than said initial thickness and performing the needlefelting between said pair of plates.

* * * * *